(12) United States Patent
Ryu et al.

(10) Patent No.: US 10,145,313 B2
(45) Date of Patent: Dec. 4, 2018

(54) SYSTEM AND METHOD FOR CONTROLLING VALVE TIMING OF CONTINUOUS VARIABLE VALVE DURATION ENGINE

(71) Applicant: Hyundai Motor Company, Seoul (KR)

(72) Inventors: In Sang Ryu, Incheon (KR); Kyoung Pyo Ha, Gyeonggi-do (KR); You Sang Son, Gyeonggi-do (KR); Kiyoung Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 236 days.

(21) Appl. No.: 15/368,408

(22) Filed: Dec. 2, 2016

(65) Prior Publication Data

US 2017/0268437 A1    Sep. 21, 2017

(30) Foreign Application Priority Data

Mar. 16, 2016    (KR) .................. 10-2016-0031680

(51) Int. Cl.
*F02D 13/02*    (2006.01)
*F01L 1/34*    (2006.01)
(Continued)

(52) U.S. Cl.
CPC .......... *F02D 13/0215* (2013.01); *F01L 1/047* (2013.01); *F01L 1/34* (2013.01);
(Continued)

(58) Field of Classification Search
CPC ............. F02D 13/0215; F02D 13/0261; F02D 41/0002; F02D 41/26; F02D 2041/002;
(Continued)

(56) References Cited

U.S. PATENT DOCUMENTS 5,161,497 A * 11/1992 Simko ................. F02D 13/0219
123/90.15
5,450,824 A * 9/1995 Yamane ................ F02D 13/023
123/90.15

(Continued)

FOREIGN PATENT DOCUMENTS

JP       07-042514 A    2/1995
JP    2010-216464 A    9/2010

(Continued)

*Primary Examiner* — Joseph Dallo
*Assistant Examiner* — Scott A Reinbold
(74) *Attorney, Agent, or Firm* — Mintz Levin Cohn Ferris Glovsky and Popeo, P.C.; Peter F. Corless

(57) ABSTRACT

A method for controlling valve timing of a continuous variable valve duration engine may include: classifying a plurality of control regions depending on an engine speed and an engine load; applying a maximum duration to an intake valve and controlling a valve overlap between an exhaust valve and an intake valve by using an exhaust valve closing (EVC) timing in a first control region; advancing an intake valve closing (IVC) timing and applying a maximum duration to the exhaust valve in a second control region; advancing the IVC timing and the EVC timing in a third control region; controlling the EVC timing in a fourth control region; controlling a throttle valve to be fully opened and controlling the IVC timing in a fifth control region; and controlling the throttle valve to be fully opened and advancing the IVC timing in a sixth control region.

11 Claims, 10 Drawing Sheets

(51) Int. Cl.
*F02D 41/26* (2006.01)
*F01L 1/047* (2006.01)
*F02D 41/00* (2006.01)
*F01L 1/344* (2006.01)
*F01L 13/00* (2006.01)
*F01L 1/053* (2006.01)

(52) U.S. Cl.
CPC ...... *F02D 13/0261* (2013.01); *F02D 41/0002* (2013.01); *F02D 41/26* (2013.01); *F01L 1/344* (2013.01); *F01L 13/0015* (2013.01); *F01L 2001/0537* (2013.01); *F01L 2250/02* (2013.01); *F02D 2041/001* (2013.01); *F02D 2041/002* (2013.01); *Y02T 10/42* (2013.01)

(58) Field of Classification Search
CPC ....... F02D 2041/001; F01L 1/047; F01L 1/34; F01L 2250/02; F01L 2001/0537; F01L 13/0015; F01L 1/344; Y02T 10/42
USPC ........................................................ 701/103
See application file for complete search history.

(56) References Cited

U.S. PATENT DOCUMENTS

| | | | | |
|---|---|---|---|---|
| 9,862,340 | B2* | 1/2018 | Kim | B60K 37/06 |
| 9,889,838 | B2* | 2/2018 | Ryu | F01L 1/34 |
| 9,932,908 | B2* | 4/2018 | Ryu | F01L 1/34 |
| 2009/0031973 | A1* | 2/2009 | Murata | F02D 13/0238 |
| | | | | 123/90.16 |
| 2010/0217504 | A1* | 8/2010 | Fujii | F01L 1/344 |
| | | | | 701/105 |
| 2014/0046571 | A1* | 2/2014 | Cowgill | F02D 41/0085 |
| | | | | 701/102 |
| 2017/0234243 | A1* | 8/2017 | Ryu | F02D 13/0234 |
| | | | | 123/350 |

FOREIGN PATENT DOCUMENTS

| | | |
|---|---|---|
| KR | 10-0321206 B1 | 1/2002 |
| KR | 10-2009-0013007 A | 2/2009 |

* cited by examiner

SYSTEM AND METHOD FOR CONTROLLING VALVE TIMING OF CONTINUOUS VARIABLE VALVE DURATION ENGINE

CROSS-REFERENCE TO RELATED APPLICATION

This application claims under 35 U.S.C. § 119(a) the benefit of Korean Patent Application No. 10-2016-0031680 filed in the Korean Intellectual Property Office on Mar. 16, 2016, the entire contents of which are incorporated herein by reference.

BACKGROUND (a) Technical Field

The present disclosure relates to a system and method for controlling valve timing of a continuous variable valve duration engine, more particularly, to a system and method for controlling valve timing of a continuous variable valve duration engine that simultaneously controls duration and timing of the continuous variable valve by mounting a continuous variable valve timing device on an intake and mounting a continuous variable valve duration device on an exhaust of the continuous variable valve duration engine, which is preferably a turbo engine.

(b) Description of the Related Art

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a piston by the explosion pressure into rotating motion to actuate an intake valve and an exhaust valve, and while the intake valve is opened, air is suctioned into a combustion chamber, and while the exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling opening duration of an intake valve and an exhaust valve of the engine, and a continuous variable valve timing (CVVT) device controlling opening timing and closing timing of the intake valve and the exhaust of the engine, have been developed.

The CVVD device adjusts duration of the valve. In addition, the CVVT device advances or retards opening and closing timing of the valve in a state in which the duration of the valve is fixed. In other words, when the opening timing of the valve is determined, the closing timing is automatically determined according to the duration of the valve.

The above information disclosed in this Background section is only for enhancement of understanding of the background of the disclosure and therefore it may contain information that does not form the prior art that is already known in this country to a person of ordinary skill in the art.

SUMMARY

The present disclosure provides a system and method for controlling valve timing of a continuous variable valve duration engine having advantages of simultaneously controlling duration and timing of the continuous variable valve by mounting a continuous variable valve timing device on an intake and mounting a continuous variable valve duration device on an exhaust of the continuous variable valve duration engine, which is preferably a turbo engine.

A method for controlling valve timing of a turbo engine provided with a continuous variable valve timing (CVVT) device at an intake and a continuous variable valve duration (CVVD) device at an exhaust according to an exemplary embodiment of the present disclosure may include: classifying, by a controller, a plurality of control regions depending on an engine speed and an engine load; applying, by the controller, a maximum duration to an intake valve and controlling a valve overlap between an exhaust valve and the intake valve by using an exhaust valve closing (EVC) timing in a first control region; advancing, by the controller, an intake valve closing (IVC) timing and applying a maximum duration to the exhaust valve in a second control region; advancing, by the controller, the IVC timing and the EVC timing in a third control region; controlling, by the controller, the EVC timing to be close to a top dead center (TDC) in a fourth control region; controlling, by the controller, a throttle valve to be fully opened and controlling the IVC timing to an angle after a bottom dead center (BDC) in a fifth control region; and controlling, by the controller, the throttle valve to be fully opened and advancing the IVC timing in a sixth control region.

The IVC timing may be fixed, and the EVC timing may be set as a maximum value capable of maintaining combustion stability in the first control region.

The maximum duration may be applied to the exhaust valve by controlling the EVC timing to generate a maximum valve overlap in the second control region.

The IVC timing may be advanced to be close to the BDC when the engine speed is less than a predetermined speed, and the IVC timing may be advanced to an angle after the BDC when the engine speed is equal to or greater than the predetermined speed in the third control region.

The EVC timing may be controlled to be close to the TDC to reduce the valve overlap in the sixth control region.

A system for controlling valve timing of a continuous variable valve duration engine including a turbocharger according to an exemplary embodiment of the present disclosure may include: a data detector detecting data related to a running state of a vehicle; a camshaft position sensor detecting a position of a camshaft; an intake continuous variable valve timing (CVVT) device controlling opening timing and closing timing of an intake valve of the engine; an exhaust continuous variable valve duration (CVVD) device controlling opening duration of an exhaust valve of the engine; and a controller classifying a plurality of control regions depending on an engine speed and an engine load based on signals from the data detector and the camshaft position sensor, and controlling operations of the intake CVVT device and the exhaust CVVD device according to the plurality of control regions, wherein the controller applies a maximum duration to an intake valve and controls a valve overlap between the exhaust valve and the intake valve by using an exhaust valve closing (EVC) timing in a first control region, advances an intake valve closing (IVC) timing and applies a maximum duration to the exhaust valve in a second control region, advances the IVC timing and the EVC timing in a third control region, controls the EVC timing to be close to a top dead center (TDC) in a fourth control region, controls a throttle valve to be fully opened and controls the IVC timing to an angle after a bottom dead center (BDC) in a fifth control region, controls the throttle valve to be fully opened and advances the IVC timing in a sixth control region.

The controller may fix the IVC timing and may set the EVC timing as a maximum value capable of maintaining combustion stability in the first control region.

The controller may apply the maximum duration to the exhaust valve by controlling the EVC timing to generate a maximum valve overlap in the second control region.

The controller may advance the IVC timing to be close to the BDC when the engine speed is less than a predetermined speed and may advance the IVC timing to an angle after the BDC when the engine speed is equal to or greater than the predetermined speed in the third control region.

The controller may control the EVC timing to be close to the TDC to reduce the valve overlap in the sixth control region.

A non-transitory computer readable medium containing program instructions executed by a processor can include: program instructions that classify a plurality of control regions depending on an engine speed and an engine load; program instructions that apply a maximum duration to an intake valve and control a valve overlap between an exhaust valve and the intake valve by using an exhaust valve closing (EVC) timing in a first control region; program instructions that advance an intake valve closing (IVC) timing and apply a maximum duration to the exhaust valve in a second control region; program instructions that advance the IVC timing and the EVC timing in a third control region; program instructions that control the EVC timing to be close to a top dead center (TDC) in a fourth control region; program instructions that control a throttle valve to be fully opened and control the IVC timing to an angle after a bottom dead center (BDC) in a fifth control region; and program instructions that control the throttle valve to be fully opened and advance the IVC timing in a sixth control region.

According to an exemplary embodiment of the present disclosure, duration and timing of the continuous variable valve are simultaneously controlled, so the engine may be controlled under desirable conditions.

Opening timing and closing timing off the intake valve and exhaust valve are appropriately controlled, thereby improving fuel efficiency under a partial load condition and power performance under a high load condition. In addition, a fuel amount for start may be reduced by increasing a valid compression ratio, and exhaust gas may be reduced by shortening time for heating a catalyst.

Further, since a continuous variable valve duration device at the intake and a continuous variable valve timing device at the exhaust are omitted, production cost may be reduced.

DETAILED DESCRIPTION OF THE EMBODIMENTS

Figure 1:
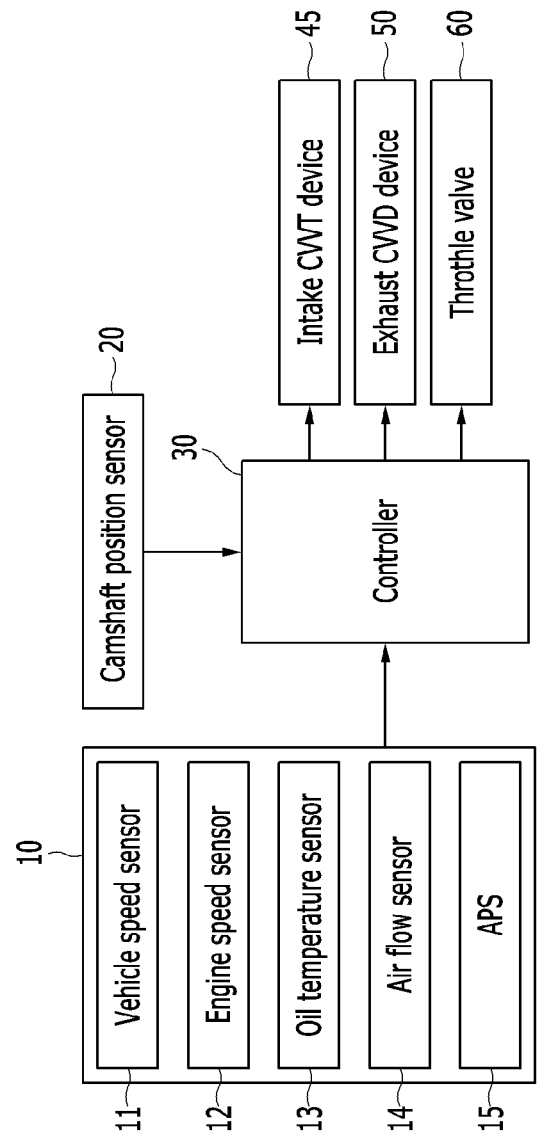
FIG. 1 is a schematic block diagram showing a system for controlling valve timing of a continuous variable valve duration engine according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

An exemplary embodiment of the present disclosure will hereinafter be described in detail with reference to the accompanying drawings.

FIG. 1 is a schematic block diagram showing a system for controlling valve timing of a continuous variable valve duration engine according to an exemplary embodiment of the present disclosure.

In the exemplary embodiment of the present disclosure, the engine as a power source of a vehicle preferably is a turbo engine that includes a turbocharger.

As shown in FIG. 1, a system for controlling valve timing of a continuous variable valve duration engine includes a data detector 10, a camshaft position sensor 20, a controller 30, an intake continuous variable valve timing (CVVT) device 45, an exhaust continuous variable valve duration (CVVD) device 50, and a throttle valve 60.

The data detector 10 detects data related to a running state of the vehicle for controlling the CVVD device and the CVVT device, and includes a vehicle speed sensor 11, an engine speed sensor 12, an oil temperature sensor 13, an air flow sensor 14, and an accelerator pedal position sensor 15, although other sensors may be employed as desired.

The vehicle speed sensor 11 detects a vehicle speed, and transmits a signal corresponding thereto to the controller 30. The vehicle speed sensor 11 may be mounted at a wheel of the vehicle.

The engine speed sensor 12 detects an engine speed from a change in phase of a crankshaft or camshaft, and transmits a signal corresponding thereto to the controller 30.

The oil temperature sensor (OTS) 13 detects temperature of oil flowing through an oil control valve (OCV), and transmits a signal corresponding thereto to the controller 30.

The oil temperature detected by the oil temperature sensor 13 may be determined by determining a coolant temperature using a coolant temperatures sensor mounted at a coolant passage of an intake manifold. Therefore, as described herein, the oil temperature sensor 13 may include the coolant temperature sensor, and the oil temperature should be understood to be the coolant temperature.

The air flow sensor 14 detects an air amount flowing into the intake manifold, and transmits a signal corresponding thereto to the controller 30.

The accelerator pedal position sensor 15 detects a degree at which a driver pushes an accelerator pedal, and transmits a signal corresponding thereto to the controller 30. A position value of the accelerator pedal is 100% when the accelerator pedal is pressed fully, and the position value of the accelerator pedal is 0% when the accelerator pedal is not pressed at all.

A throttle valve position sensor that is mounted on an intake passage may be used instead of the accelerator pedal position sensor 15. Therefore, as described herein, the accelerator pedal position sensor 15 may include the throttle valve position sensor, and the position value of the accelerator pedal should be understood to be an opening value of the throttle valve.

The camshaft position sensor 20 detects a position of a camshaft angle, and transmits a signal corresponding thereto to the controller 30.

Figure 2:
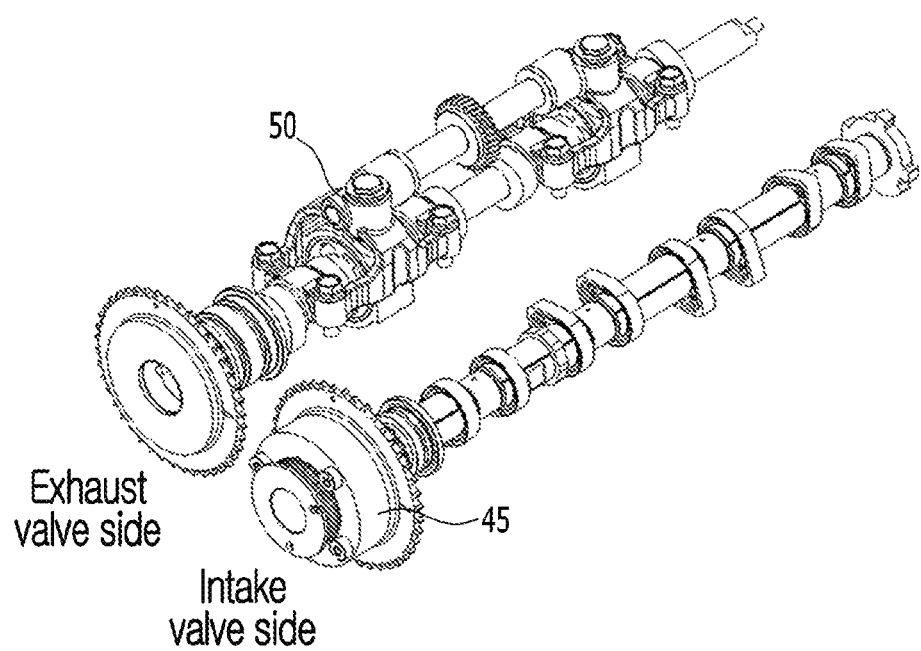
FIG. 2 is a perspective view showing an intake provided with a continuous variable valve timing device and an exhaust provided with a continuous variable valve duration device according to an exemplary embodiment of the present disclosure.

FIG. 2 is a perspective view showing an intake provided with a continuous variable valve timing device and an exhaust provided with a continuous variable valve duration device according to an exemplary embodiment of the present disclosure.

As shown in FIG. 2, the continuous variable valve timing device and a fixed cam are mounted on the intake, and the continuous variable valve duration device and a fixed opening device are mounted on the exhaust.

Therefore, intake valve duration (IVD) and exhaust valve opening (EVO) timing are fixed in the exemplary embodiment of the present disclosure. If the IVD becomes long, fuel efficiency and high speed performance of the vehicle may be improved, but low speed performance may be deteriorated. Thus, the IVD may be fixed at an angle of approximately 250 to 260 degrees. In addition, the EVO timing may be fixed at an angle of approximately 40 to 50 degrees before bottom dead center (BDC).

The intake continuous variable valve timing (CVVT) device 45 controls opening timing and closing timing of an intake valve of the engine according to a signal from the controller 30.

The exhaust continuous variable valve duration (CVVD) device 50 controls opening duration of an exhaust valve of the engine according to a signal from the controller 30.

The throttle valve 60 adjusts the air amount flowing into the intake manifold.

The controller 30 classifies a plurality of control regions depending on an engine speed and an engine load based on signals of the data detector 10 and the camshaft position sensor 20, and controls operations of the intake CVVT device 45 and the exhaust CVVD device 50. For example, as provided herein, the plurality of control regions may be classified into six regions.

Since the IVD and the EVO timing are fixed, the controller 30 may control intake valve closing (IVC) timing and exhaust valve closing (EVC) timing by using the intake CVVT device 45 and the exhaust CVVD device 50. When the IVC timing is controlled, intake valve opening (IVO) timing is determined based on the IVD.

The controller 30 applies a maximum duration to the intake valve and controls a valve overlap between the exhaust valve and the intake valve by using the EVC timing in a first control region, advances the IVC timing and applies a maximum duration to the exhaust valve in a second control region, advances the IVC timing and the EVC timing in a third control region, controls the EVC timing to be close to top dead center in a fourth control region, controls the throttle valve to be fully opened and controls the IVC timing to an angle after bottom dead center (BDC) in a fifth control region, and controls the throttle valve to be fully opened and advances the IVC timing in a sixth control region.

For these purposes, the controller 30 may be implemented with at least one processor executed by a predetermined program, and the predetermined program may programmed in order to perform each step of a method for controlling valve timing of a continuous variable valve duration engine according to an exemplary embodiment of the present disclosure.

Various embodiments described herein may be implemented within a recording medium that may be read by a computer or similar device by using software, hardware, or a combination thereof, for example.

For example, the hardware described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions.

The software such as procedures and functions described in the present embodiments may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to an exemplary embodiment of the present disclosure will be described in detail with reference to FIG. 3A to FIG. 5C.

Figure 3A:
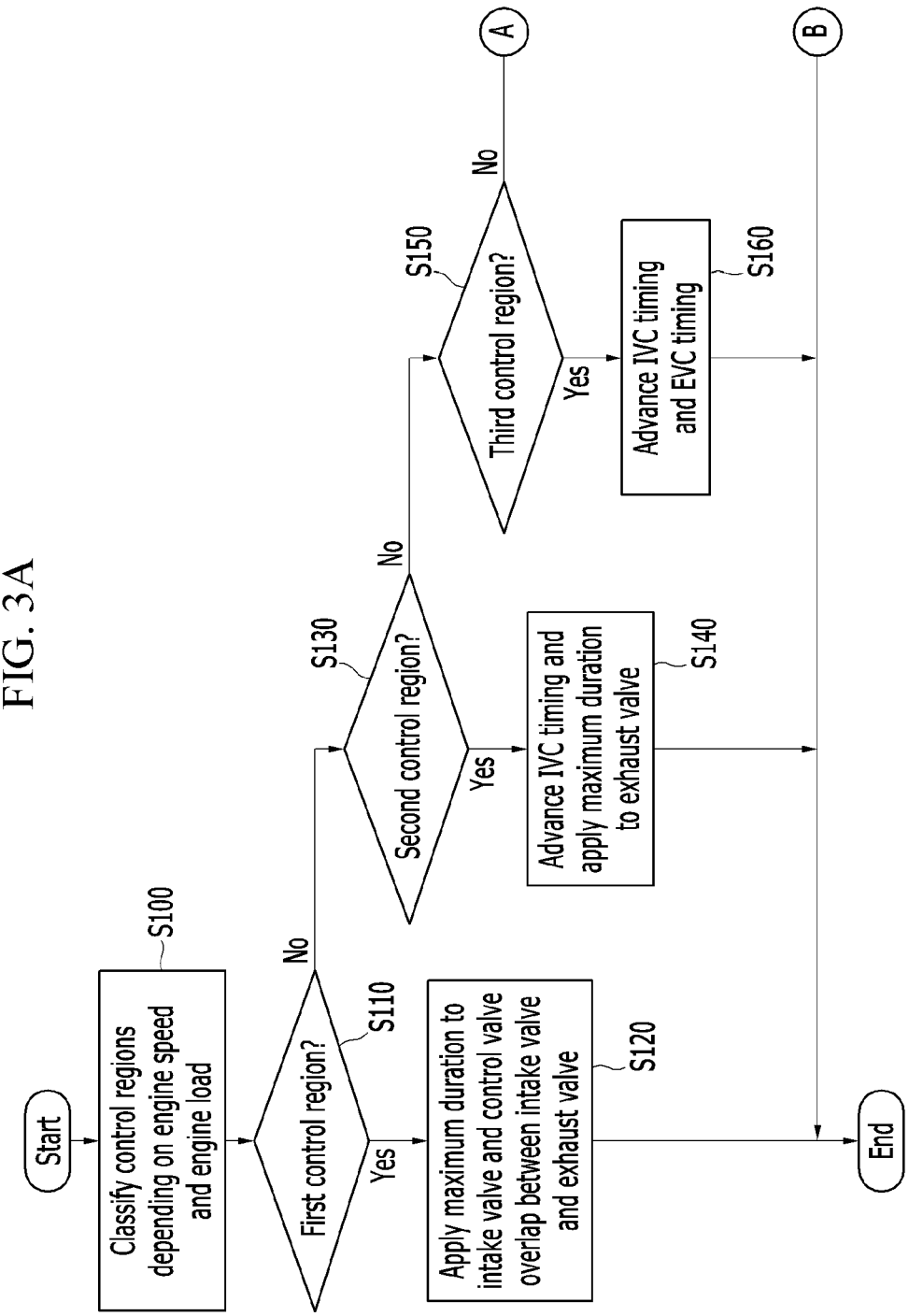
FIGS. 3A-3B are flowcharts showing a method for controlling valve timing of a continuous variable valve duration engine according to an exemplary embodiment of the present disclosure.
Figure 3B:
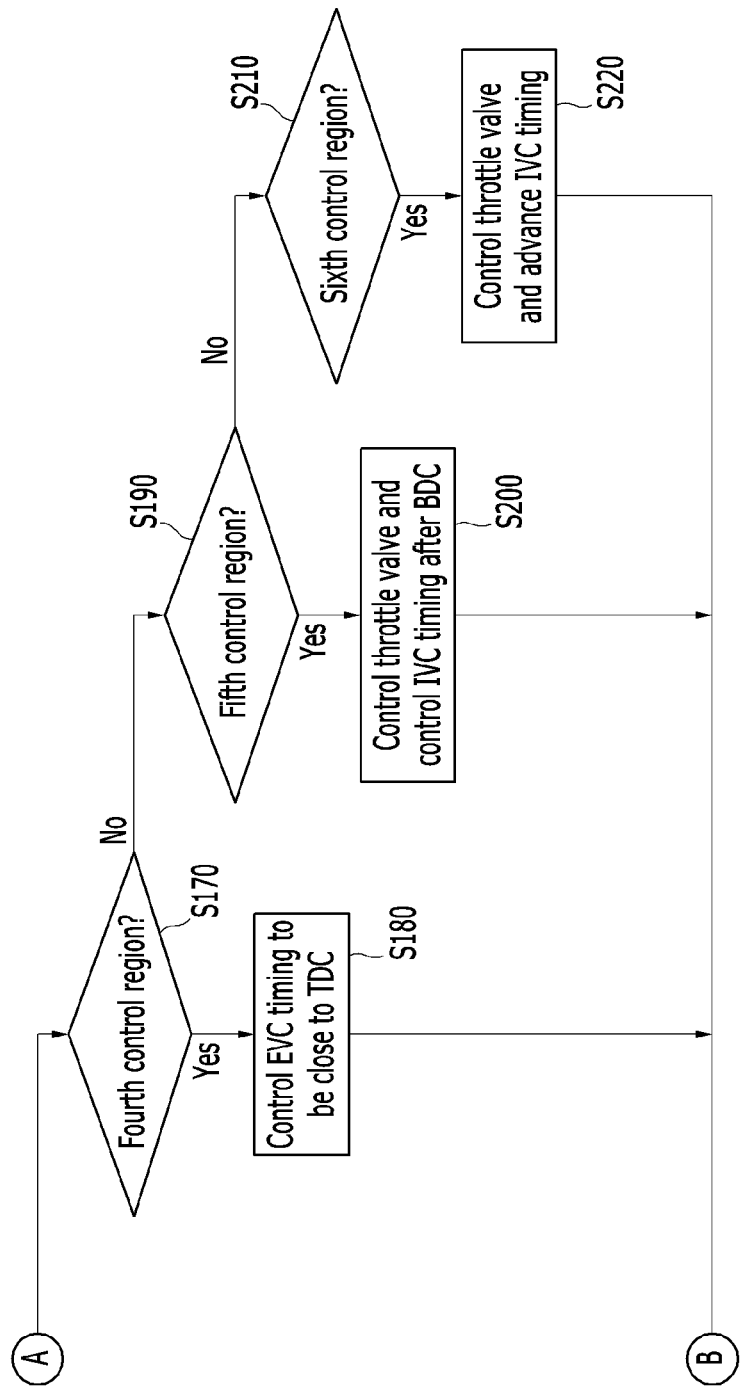
Figure 4A:
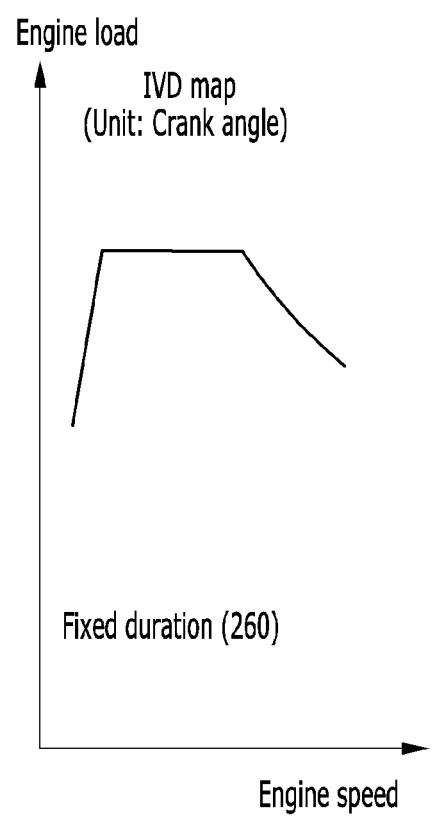
FIGS. 4A-4C are graphs showing duration, opening timing, and closing timing of an intake valve depending on an engine load and an engine speed according to an exemplary embodiment of the present disclosure.
Figure 4B:
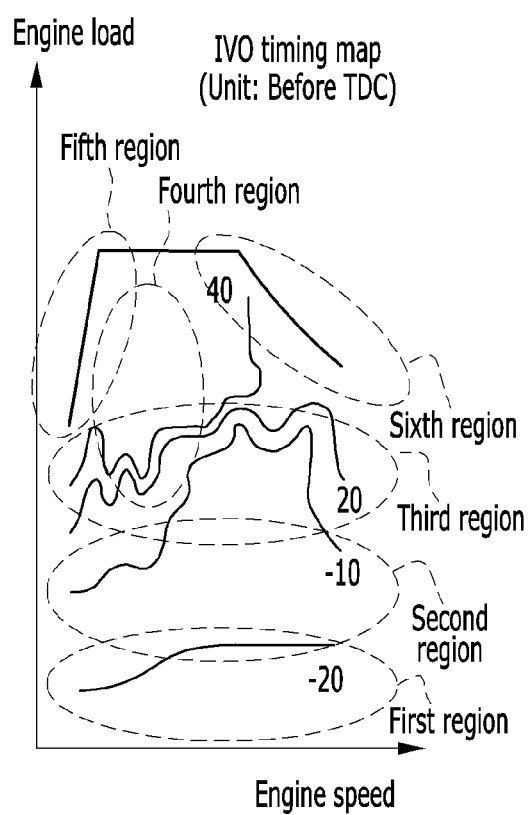
Figure 4C:
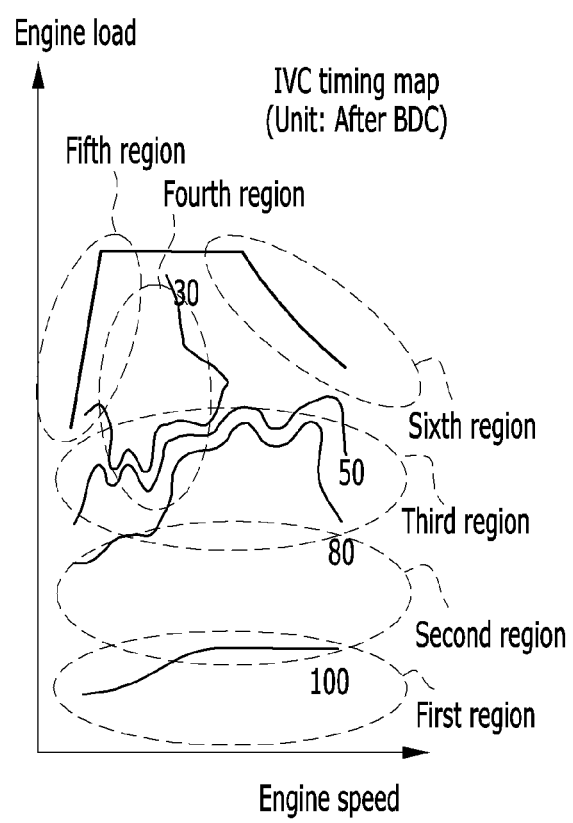
Figure 5A:
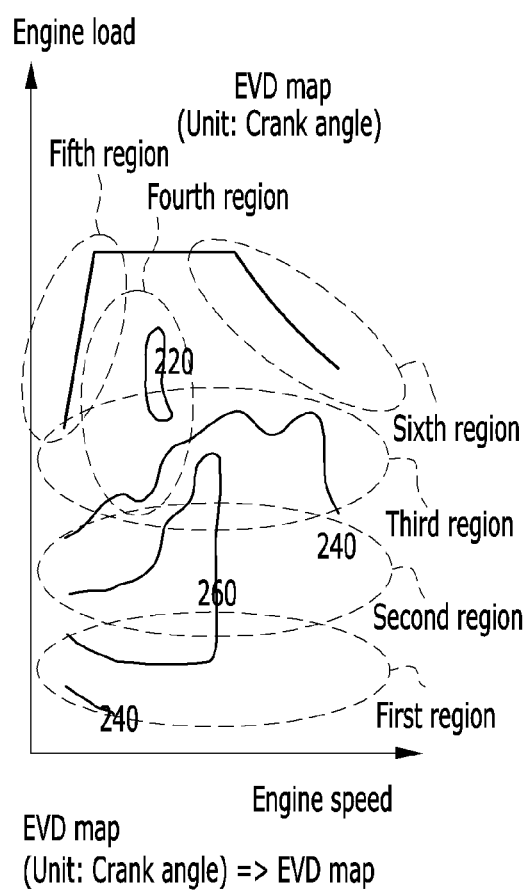
FIGS. 5A-5C are graphs showing duration, opening timing, and closing timing of an exhaust valve depending on an engine load and an engine speed according to an exemplary embodiment of the present disclosure.
Figure 5B:
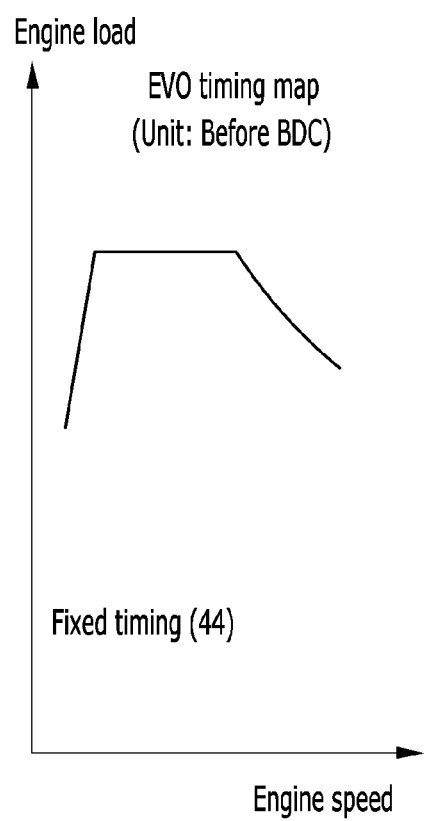
Figure 5C:
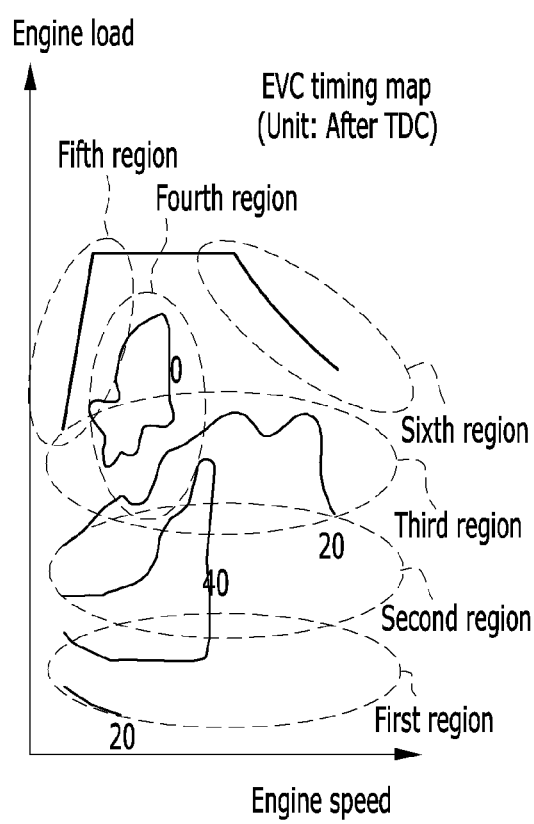

FIGS. 3A and 3B are flowcharts showing a method for controlling valve timing of a continuous variable valve duration engine according to an exemplary embodiment of the present disclosure. In addition, FIGS. 4A-4C are graphs showing duration, opening timing, and closing timing of an intake valve depending on an engine load and an engine speed according to an exemplary embodiment of the present disclosure, and FIGS. 5A-5C are graphs showing duration, opening timing, and closing timing of an exhaust valve depending on an engine load and an engine speed according to an exemplary embodiment of the present disclosure.

As shown in FIGS. 3A and 3B, a method for controlling valve timing of a continuous variable valve duration engine according to an exemplary embodiment of the present disclosure begins with classifying a plurality of control regions depending on an engine load and an engine speed at step S100. The first to sixth control regions are indicated in FIG. 4A to FIG. 5C.

The controller 30 may classify control regions as a first control region when the engine load is less than a first predetermined load, a second control region when the engine load is equal to or greater than the first predetermined load and less than a second predetermined load, and a third control region when the engine load is equal to or greater than the second predetermined load and less than a third predetermined load. In addition, the controller 30 may classify control regions as a fourth control region when the engine load is equal to or greater than the second predetermined load and the engine speed is equal to or greater than a first predetermined speed and less than a second predetermined speed, a fifth control region when the engine load is equal to or greater than the third predetermined load and the engine speed is less than the first predetermined speed, and a sixth control region when the engine load is equal to or greater than the third predetermined load and the engine speed is equal to or greater than the second predetermined speed.

Meanwhile, as shown in FIG. 4A to FIG. 5C, a crank angle is indicated in an intake valve duration (IVD) map and an exhaust valve duration (EVD) map. For example, regarding the EVD map, a curved line indicated by '240' in the third control region means that the crank angle is 240 degrees, and a curved line indicated by '260' means that the crank angle is 260 degrees. Although not illustrated in the drawings, a curved line having a crank angle between 240 and 260 may exist between the curved lines.

In addition, a number designated in an intake valve opening (IVO) timing map represents before top dead center (TDC), a number designated an intake valve closing (IVC) timing map represents after bottom dead center (BDC), a number designated in an exhaust valve opening (EVO) timing map represents before BDC, and a number designated in an exhaust valve closing (EVC) timing map represents after TDC.

Regions and curved lines shown in FIG. 4A to FIG. 5C are just examples for describing the exemplary embodiment of the present disclosure, and the present disclosure is not limited thereto.

When the control regions are classified depending on the engine load and the engine speed at step S100, the controller 30 determines whether a current engine state belongs to the first control region at step S110.

When the engine load is less than the first predetermined load at step S110, the controller 30 determines that the current engine state belongs to the first control region. In this case, the controller 30 applies the maximum duration to the intake valve and controls the valve overlap between the exhaust valve and the intake valve at step S120. The valve overlap represents a state in which the intake valve is opened and the exhaust valve is not closed yet.

In other words, when the engine load is operated at a low load condition, the controller 30 may fix the IVO timing to apply the maximum duration to the intake valve. The IVC timing may be fixed at an angle of 100 to 110 degrees after BDC. In this case, the IVO timing may be controlled to an angle of 20 to 30 degrees before TDC depending on the fixed IVD.

In addition, the controller 30 may set EVC timing as a maximum value capable of maintaining combustion stability by moving the EVC timing in an after TDC direction. As the valve overlap is increased, fuel efficiency may be improved, but combustion stability may be deteriorated. Accordingly, properly setting the valve overlap is desired. By setting the EVC timing as the maximum value capable of maintaining combustion stability, optimal valve overlap may be realized, and thus fuel efficiency may be improved. In this case, the EVO timing may be controlled to an angle of 40 to 50 degrees before BDC to maintain combustion stability.

When the current engine state does not belong to the first control region at step S110, the controller 30 determines whether the current engine state belongs to the second control region at step S130.

When the engine load is equal to or greater than the first predetermined load and less than the second predetermined load at step S130, the controller 30 determines that the current engine state belongs to the second control region. In this case, the controller 30 advances the IVC timing and applies a maximum duration to the exhaust valve at step S140.

Since the maximum duration is applied to the intake valve in the first control region, the IVC timing is controlled to a late intake valve close (LIVC) position. When the IVC timing is positioned at the LIVC position in the second control region, the valve overlap is not generated. Accordingly, the controller 30 advances the IVC timing to generate the valve overlap.

Since the EVO timing is fixed so as to be advantageous in terms of exhaust pumping, the EVC timing is controlled to generate a maximum valve overlap, such that fuel efficiency may be improved.

When the current engine state does not belong to the second control region at step S130, the controller 30 determines that the current engine state belongs to the third control region at step S150.

When the current engine state belongs to the third control region at step S150, the controller 30 advances the IVC timing and the EVC timing at step S160.

When the IVC timing is positioned at the LIVC position, as the engine load is increased, boost pressure may be increased, knocking may occur, and fuel efficiency may be deteriorated. In order to prevent or reduce the aforementioned phenomenon, the controller 30 advances the IVC timing in the third control region where the engine load is relatively large.

In this case, so as to reflect characteristics of the turbo engine, the controller 30 may rapidly advance the IVC timing to be close to BDC when the engine speed is less than a predetermined speed, and may slowly advance the IVC timing to an angle of 30 to 50 degrees after BDC when the engine speed is equal to or greater than the predetermined speed. For example, the predetermined speed may be 1500 rpm.

In addition, since the EVC timing is positioned at maximum valve overlap in the second control region, the controller 30 may advance the EVC timing in the third control region.

When the current engine state does not belong to the third control region at step S150, the controller 30 determines whether the current engine state belongs to the fourth control region at step S170.

When the controller 30 determines that the current engine state belongs to the fourth control region at step S170, the controller 30 controls the EVC timing to be close to TDC at step S180.

The fourth control region may be a low boost region at which the engine load is equal to or greater than the second predetermined load and the engine speed is equal to or greater than the first predetermined speed and less than the second predetermined speed. For example, the first predetermined speed may be 1500 rpm, and the second predetermined speed may be 2500 rpm.

When the IVC timing is close to BDC and short duration of the intake valve is used in the fourth control region, fuel efficiency may be improved. Since the IVD is fixed, when the IVC timing is controlled to be close to BDC, the IVO timing is advanced in the TDC direction and the valve overlap is increased.

Accordingly, the controller 30 controls the EVC timing to be close to TDC so as to reduce the valve overlap.

When the current engine state does not belong to the fourth control region at step S170, the controller 30 determines whether the current engine state belongs to the fifth control region at step S190.

When the engine load is equal to or greater than the third predetermined load and the engine speed is less than the first predetermined speed at step S190, the controller 30 determines that the current engine state belongs to the fifth control region. In this case, the controller 30 controls the throttle valve 60 to be fully opened and controls the IVC timing to an angle after BDC at step S200.

In the turbo engine, when the throttle valve is fully opened (i.e., WOT; Wide Open Throttle) in the fifth control region at which the engine speed is less than the first predetermined speed (e.g., 1500 rpm), intake port pressure becomes higher than exhaust port pressure. Therefore, a scavenging phenomenon occurs easily compared to a natural aspirated engine.

In order to generate the scavenging phenomenon in which combustion gas is emitted due to reduction of exhaust port pressure, the IVO timing is controlled to an angle of 20 to 40 degrees before TDC and the IVC timing is controlled to an angle of 0 to 20 degrees. However, the IVD is fixed in the exemplary embodiment of the present disclosure, when the IVO timing is advanced before TDC, the IVC timing may be greater than 20 degrees after BDC.

The EVO timing needs to be retarded to an angle after BDC to maximize the scavenging phenomenon through exhaust interference reduction, but the EVO timing is fixed at the angle before BDC in the exemplary embodiment of the present disclosure. Accordingly, the controller 30 may control the EVC timing to be close to TDC to reduce the valve overlap.

When the current engine state does not belong to the fifth control region at step S190, the controller 30 determines whether the current engine state belongs to the sixth control region at step S210.

When the engine load is equal to or greater than the third predetermined load and the engine speed is equal to or greater than the second predetermined speed, the controller 30 determines that the current engine state belongs to the sixth control region. In this case, the controller 30 controls the throttle valve 60 to be fully opened and advances the IVC timing at step S220.

When the engine speed is equal to or greater than the second predetermined speed (e.g., 2500 rpm), since the exhaust port pressure is significantly greater than the intake port pressure, the scavenging phenomenon disappears. Since the EVO timing is fixed to be advantageous to exhaust pumping, the EVC timing is controlled to be close to TDC to reduce the valve overlap.

Meanwhile, when WOT control is performed at a high speed condition, the knocking hardly occurs in a natural aspirated engine, but on the contrary, the knocking easily occurs in the turbo engine. Accordingly, the controller 30 advances the IVC timing within an angle of 50 degrees after BDC to reduce boost pressure such that the knocking is prevented.

As described above, according to an exemplary embodiment of the present disclosure, duration and timing of the continuous variable valve are simultaneously controlled, so the engine may be controlled under desirable conditions.

Opening timing and closing timing off the intake valve and exhaust valve are appropriately controlled, thereby improving fuel efficiency under a partial load condition and power performance under a high load condition. In addition, a fuel amount for start may be reduced by increasing a valid compression ratio, and exhaust gas may be reduced by shortening time for heating a catalyst.

Further, since a continuous variable valve duration device at the intake and a continuous variable valve timing device at the exhaust are omitted, production cost may be reduced.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method for controlling valve timing of a turbo engine provided with a continuous variable valve timing (CVVT) device at an intake and a continuous variable valve duration (CVVD) device at an exhaust, the method comprising:
classifying, by a controller, a plurality of control regions depending on an engine speed and an engine load;
applying, by the controller, a maximum duration to an intake valve and controlling a valve overlap between an exhaust valve and the intake valve by using an exhaust valve closing (EVC) timing in a first control region;

advancing, by the controller, an intake valve closing (IVC) timing and applying a maximum duration to the exhaust valve in a second control region;

advancing, by the controller, the IVC timing and the EVC timing in a third control region;

controlling, by the controller, the EVC timing to be close to a top dead center (TDC) in a fourth control region;

controlling, by the controller, a throttle valve to be fully opened and controlling the IVC timing to an angle after a bottom dead center (BDC) in a fifth control region; and controlling, by the controller, the throttle valve to be fully opened and advancing the IVC timing in a sixth control region.

2. The method of claim 1, wherein the IVC timing is fixed, and the EVC timing is set as a maximum value capable of maintaining combustion stability in the first control region.

3. The method of claim 1, wherein the maximum duration is applied to the exhaust valve by controlling the EVC timing to generate a maximum valve overlap in the second control region.

4. The method of claim 1, wherein the IVC timing is advanced to be close to the BDC when the engine speed is less than a predetermined speed, and the IVC timing is advanced to an angle after the BDC when the engine speed is equal to or greater than the predetermined speed in the third control region.

5. The method of claim 1, wherein the EVC timing is controlled to be close to the TDC to reduce the valve overlap in the sixth control region.

6. A system for controlling valve timing of a continuous variable valve duration engine including a turbocharger, the system comprising:

a data detector detecting data related to a running state of a vehicle;

a camshaft position sensor detecting a position of a camshaft;

an intake continuous variable valve timing (CVVT) device controlling opening timing and closing timing of an intake valve of the engine;

an exhaust continuous variable valve duration (CVVD) device controlling opening duration of an exhaust valve of the engine; and a controller classifying a plurality of control regions depending on an engine speed and an engine load based on signals from the data detector and the camshaft position sensor, and controlling operations of the intake CVVT device and the exhaust CVVD device according to the plurality of control regions, wherein the controller applies a maximum duration to an intake valve and controls a valve overlap between the exhaust valve and the intake valve by using an exhaust valve closing (EVC) timing in a first control region, advances an intake valve closing (IVC) timing and applies a maximum duration to the exhaust valve in a second control region, advances the IVC timing and the EVC timing in a third control region, controls the EVC timing to be close to a top dead center (TDC) in a fourth control region, controls a throttle valve to be fully opened and controls the IVC timing to an angle after a bottom dead center (BDC) in a fifth control region, controls the throttle valve to be fully opened and advances the IVC timing in a sixth control region.

7. The system of claim 6, wherein the controller fixes the IVC timing and sets the EVC timing as a maximum value capable of maintaining combustion stability in the first control region.

8. The system of claim 6, wherein the controller applies the maximum duration to the exhaust valve by controlling the EVC timing to generate a maximum valve overlap in the second control region.

9. The system of claim 6, wherein the controller advances the IVC timing to be close to the BDC when the engine speed is less than a predetermined speed and advances the IVC timing to an angle after the BDC when the engine speed is equal to or greater than the predetermined speed in the third control region.

10. The system of claim 6, wherein the controller controls the EVC timing to be close to the TDC to reduce the valve overlap in the sixth control region.

11. A non-transitory computer readable medium containing program instructions executed by a processor, the computer readable medium comprising:

program instructions that classify a plurality of control regions depending on an engine speed and an engine load;

program instructions that apply a maximum duration to an intake valve and control a valve overlap between an exhaust valve and the intake valve by using an exhaust valve closing (EVC) timing in a first control region;

program instructions that advance an intake valve closing (IVC) timing and apply a maximum duration to the exhaust valve in a second control region;

program instructions that advance the IVC timing and the EVC timing in a third control region;

program instructions that control the EVC timing to be close to a top dead center (TDC) in a fourth control region;

program instructions that control a throttle valve to be fully opened and control the IVC timing to an angle after a bottom dead center (BDC) in a fifth control region; and program instructions that control the throttle valve to be fully opened and advance the IVC timing in a sixth control region.

* * * * *